Figure 1:
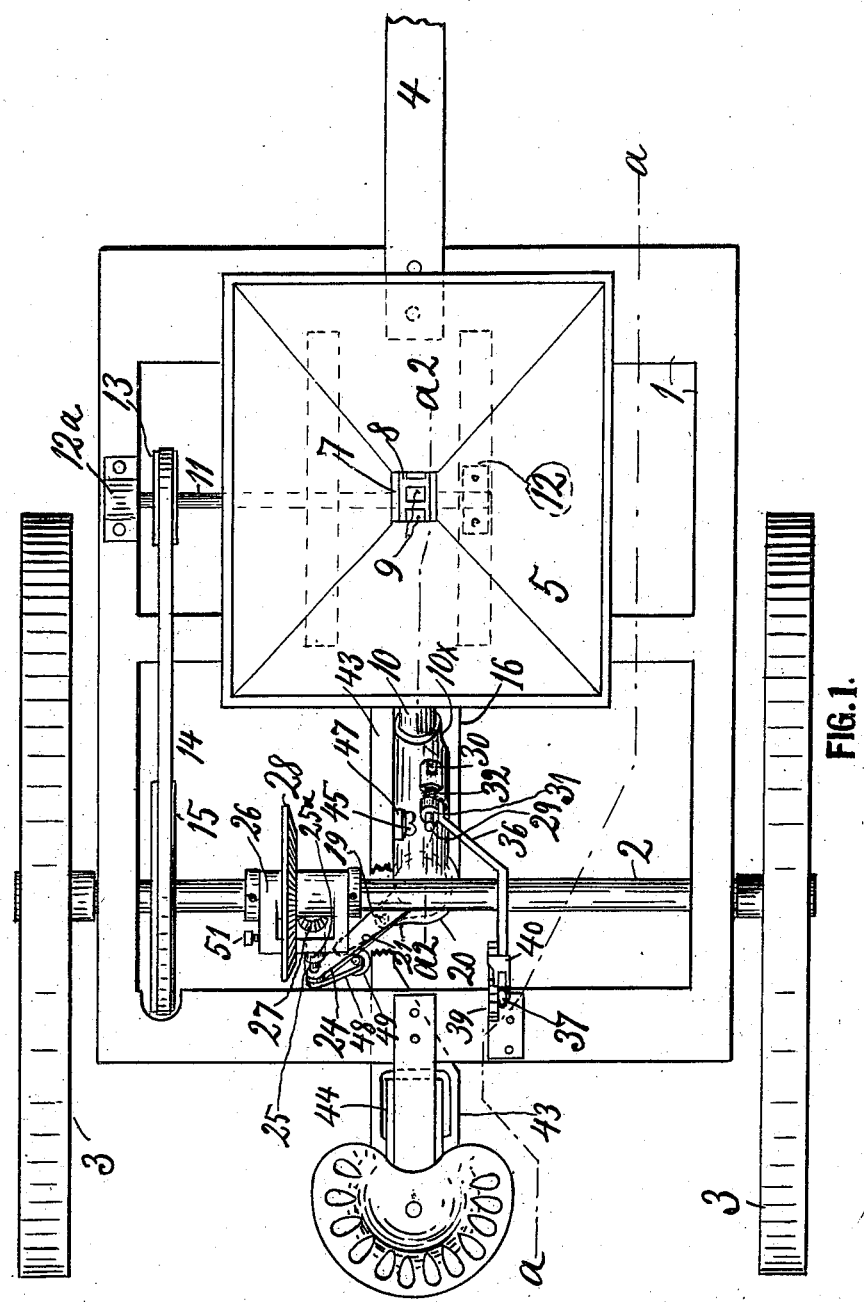

S. SÓRENSEN.
SEEDING MACHINE.
APPLICATION FILED SEPT. 19, 1910.

981,704.

Patented Jan. 17, 1911.
2 SHEETS—SHEET 1.

WITNESSES:
M. M. Carlsen.
A. E. Carlsen.

INVENTOR:
Sören Sörensen.
BY his ATTORNEY:
A. M. Carlsen.

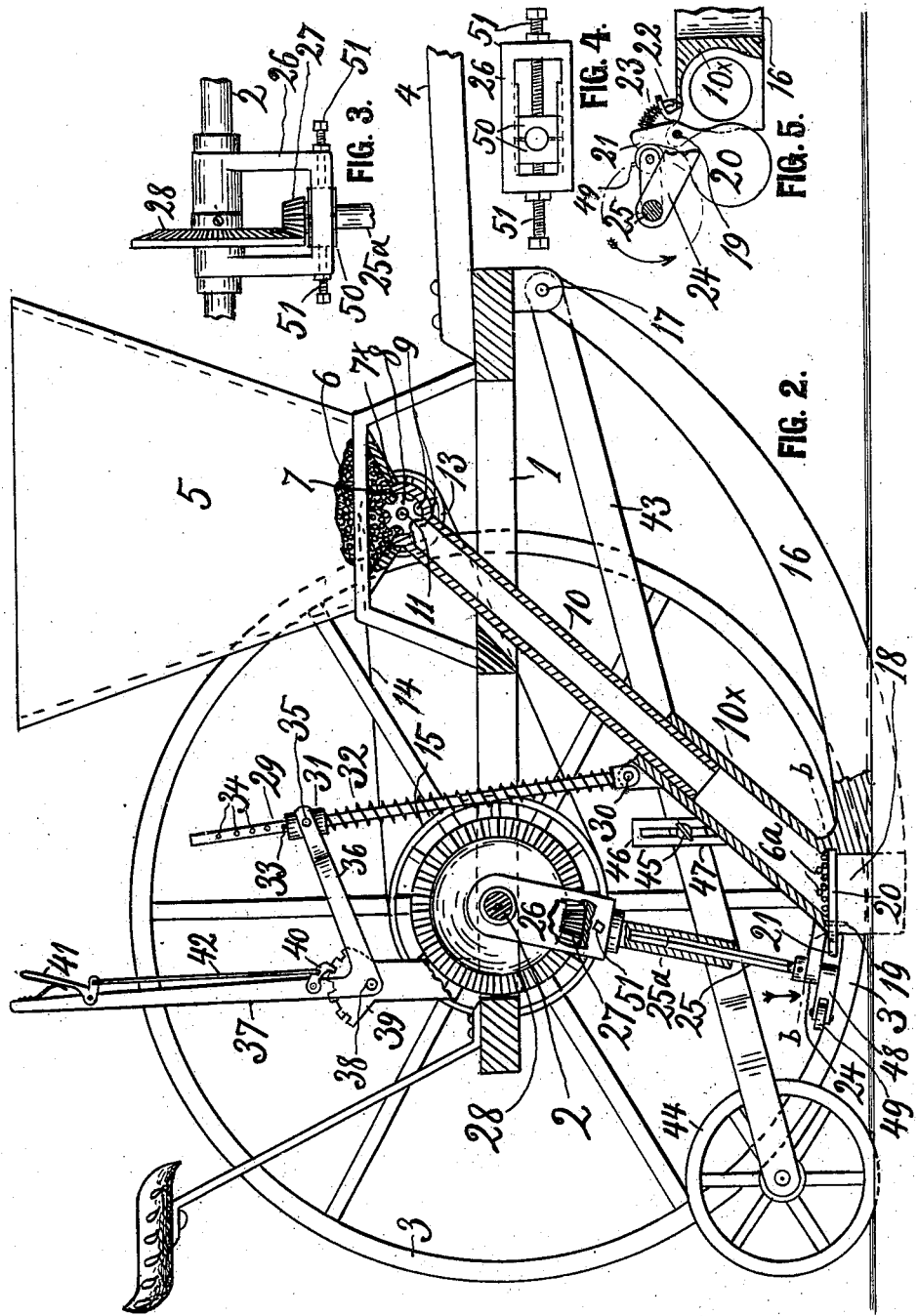

UNITED STATES PATENT OFFICE.

SÓREN SÓRENSEN, OF EATON, COLORADO.

SEEDING-MACHINE.

981,704.     Specification of Letters Patent.     Patented Jan. 17, 1911.

Application filed September 19, 1910. Serial No. 582,737.

*To all whom it may concern:*

Be it known that I, SÓREN SÓRENSEN, a subject of the King of Denmark, residing at Eaton, in the county of Weld and State of Colorado, have invented a new and useful Seeding-Machine, of which the following is a specification.

My invention relates to seed planting machines for small seeds of any kind, but is especially intended for planting beet seed. Heretofore beet seed has usually been sowed broadcast, or at best in continuous rows so close together that after the seed has sprouted it has been necessary to "thin it out" by removing about three-fourths of the sprouts and their roots; and as such removed plants are usually unfit for re-planting there is that much waste of seed besides the loss of time required to do the so-called "thinning."

The object of the invention is to avoid the loss of seed and time or labor just mentioned; and I do so by the construction and combination of parts illustrated in the accompanying drawings, in which—

Figure 1 is a top or plan view of my improved seeder in a simple form. Fig. 2 is a side elevation of the machine shown in Fig. 1 with the main frame in section on the line $a$—$a$ while the seed conveying tube and the lower portion of the seed hopper is intersected on the line $a^2$—$a^2$; also some other parts have fragments broken away. Fig. 3 is a detail rear elevation of the small frame 26 and the portion of the main shaft supporting it, and the gearing connected therewith for operating the seed dropping mechanism. Fig. 4 is a bottom view of the frame in Fig. 3 and the journal box held therein. Fig. 5 is a section on the line $b$—$b$ Fig. 2.

Referring to the drawings by reference numerals, 1 designates the main frame, which is supported by a shaft 2 and two supporting wheels 3, 3, one at each end thereof, and which in their hubs are provided with the usual pawl and ratchet mechanism (not shown), by which one or both wheels impart rotatory movement to the shaft when the machine is either pushed by hand or drawn by draft animals forward on the ground. Usually animals are employed and are then hitched to a draft pole 4, with which the front end of the frame is provided.

Mounted upon the forward end of the frame is a seed hopper 5, in which 6 represents seed in Fig. 2. In an opening 7 in the bottom of the hopper rotates a wheel 8 having pockets 9, by which it feeds the seed one by one from the hopper into a seed conveying tube 10, which is jointed at $7^\times$ to the hopper in such a manner that the tube may swing rearward and upward with its lower end, as will later on be more fully described. The wheel 8 is fixed to a shaft 11, which in Fig. 2 is shown as journaled at 12 and $12^a$ to the frame work. On said shaft 11 is fixed a pulley 13, which is driven by a belt 14 and another pulley 15, which is fixed on the main shaft 2 and receives motion therefrom. It is obvious that the belt shown may be a link-belt if so desired, and in that case the pulleys will be sprocket wheels.

The lower end of the tube 10 is slidable in a lower tube section $10^\times$, which lower section is secured to the rear end of a furrow-opener or runner 16, the front end of which is pivotally secured at 17 to the front end of the main frame, and the rear end has a gap 18 through which the seed is deposited into the furrow from a shutter 20, which is pivoted at 19 and has an arm 21 (see Fig. 5) provided with a guide 22, holding a coiled spring 23, by which the shutter is closed and normally held closed, so that the seed must rest upon it, as shown by the seed $6^a$ in Fig. 2, until the shutter is opened by the following mechanism.

Projecting from the tube $10^\times$ is an arm 24, in which is journaled loosely the lower end of a shaft 25—$25^a$, whose upper end is journaled in a U-shaped frame 26, (see Fig. 3) supported on the main shaft 2. In said frame the shaft section $25^a$ is provided with a removably secured bevel pinion 27, which meshes with a bevel gear 28 fixed on the shaft 2. The shaft sections 25, $25^a$ have angular portions, as shown, slidable one in the other, so as to allow the runner and seed tube to rise and fall in moving over uneven ground; and also raising of the runner when the machine is idle; for the latter purposes the tube-sections 10 and $10^\times$ are also loosely telescoped, as already stated. Said raising of the runner for driving the machine idle is performed by a rod 29, pivotally attached at 30 to the lower tube section and having near its upper end a loosely fitted collar 31, which is held down upon a partly compressed spring 32 encircling the rod, by a cotter pin 33 inserted in either one of the holes 34 in the rod. To said collar 31 is pivoted at 35 the arm 36 of a hand lever 37, which is pivoted at 38 to a toothed sector 39, that is fixed on the main frame and engaged by a dog 40, which is pivoted to the lever and controlled by a finger lever 41 and rod 42. Pivoted at 17 is also the front end of a rearwardly extending bar 43, in whose rear end is mounted a wheel 44, which serves to close the furrow and thus cover the planted seed. Said bar is secured to the tube 10˟ by a screw 45, which is adjustable in a slot 46 of a flat arm 47 fixed on the tube; by said screw the relative depth of the wheel and the runner is regulated.

At the lower end of the shaft section 25 is fixed a radial arm 48, preferably with an antifriction roller 49 in its outer end. The upper end of the shaft section 25ª is journaled in a split bearing or journal box 50, which, as shown in Fig. 4, is slidable in the frame 26 and held in any desired position by adjustment screws 51. With each machine goes a series of differently sized bevel pinions, of which only one size, 27, is shown in my drawings; each pinion is easily exchangeable for another and the meshing with the wheel 28 is adjusted by the screws 51, the lower end of the shaft being loosely journaled in the arm 24 to allow the shaft to lean slightly to and from the bevel gear according to the size of the pinion.

In the operation of the machine the exchange of pinions 27 just described provides for variation in the distance between the hills planted in each row, as the size of the pinion causes the arm 48 to act more or less frequently on the arm 21 of the shutter 20, which is thereby opened to let the seed 6ª drop into the furrow when a certain number of seeds have accumulated on the shutter or valve 20. The number of seeds dropped from the shutter in each hill is determined by the number of pockets in the seed feeding wheel 9, and the speed of said wheel; said wheel is therefore exchangeable for other wheels (not shown) which are all of the same diameter but have different numbers of pockets.

It will be understood that if the runner 16, or the wheel 44 vibrates up and down on uneven ground the spring 32 yields for such upward motion, and still the hand lever 37 is always in operative connection for raising the runner and wheel from the ground when turning or driving the machine idle, as the pin 33 connects the collar 31 with rod 29.

It is obvious that although I have shown my invention embodied only in single form, the principle and mechanisms involved may be multiplied as may be desired in larger machines; thus there may be two or more runners with corresponding feed wheels and seed dropping tubes, &c. It will also be understood that the joint 7˟ at the bottom of the hopper is preferable for purpose of letting the seed tube swing rearward and upward, but if a flexible tube is used said joint may be dispensed with.

What I claim is:

1. In a planting machine, the combination with a main frame, a shaft supporting the same and supporting wheels at both ends of the shaft with rotatory connection therewith, of a seed hopper mounted on the frame and having an aperture in its bottom, a seed conveying tube having its upper end jointed in said aperture to swing back and forth and upwardly with its lower end, a seed feeding wheel rotatably fitted in said upper end of the tube and having a shaft operatively connected with the main shaft; a furrow-opening runner pivotally connected at its front end to the front end of the frame and having at its rear end a tubular portion loosely embracing with its upper end the lower end of the seed-conveying tube; a pivotally mounted shutter closing the lower end of the tubular extension and having an arm and a spring acting thereon to hold the shutter normally closed; a vertically disposed shaft journaled with its lower end near the shutter, and having a radial arm by which to engage the arm of the shutter and thus open the latter; said shaft having a slidable joint near its middle, and operative connection with the main shaft; a toothed sector on the frame, a hand lever mounted on the sector and provided with a finger-operated dog for locking it in different positions on the sector, and means connecting said lever with the runner for raising and lowering it, said connecting means involving a spring that permits upward vibration of the runner without moving the lever.

2. In a planter, the combination with a main frame, a shaft supporting the same and supporting wheels operatively connected with the ends of the shaft to support and rotate the same, of a seed hopper having in its bottom a seed feeding wheel, a seed conveying tube jointed to the bottom of the hopper to swing with its lower end rearward and upward, said tube being formed of two telescoping sections, a furrow-opening runner pivotally connected at its front end to the front end of the frame and having its rear end secured to the lower section of the seed-covering tube, a bar pivotally secured at its front end to the front end of the frame, a furrow-closing wheel carried by the rear end of said bar to roll in line with the runner, said bar being adjustably secured to the lower portion of the seed tube, a lever mounted on the frame and means connecting it with the seed tube and runner; a spring-closed shutter in the seed tube, and means operated from the main shaft whereby the shutter is opened at predetermined intervals when a certain number of seeds have been dropped upon it from the feeding wheel.

3. In a planting machine, the combination with a frame and a main shaft and two carrier wheels supporting same and having rotatory connection therewith, of a bevel gear secured on the shaft, a bevel pinion rotated by the bevel gear, a downwardy directed shaft having said pinion removably attached to its upper end so as to be exchangeable for larger and smaller pinions, a U-shaped frame journaled on the main shaft, a journal box embracing the upper portion of said downward shaft, said box being adjustable in the U-shaped frame toward and from the bevel gear according to the size of the pinion employed, screws in said frame for holding the box adjusted; a seed hopper and a seed-conveying tube extending therefrom, a shutter in the tube, an arm on the downward shaft for opening the shutter at each revolution of the shaft, a spring closing the shutter, and means in the base of the hopper operatively connected with the supporting wheel for feeding one seed at a time down upon the shutter.

In testimony whereof I affix my signature, in presence of two witnesses.

SÓREN SÓRENSEN.

Witnesses:
 ALFRED TUNNELL,
 FRED CARLSON.